Sept. 15, 1970     H. C. DECK     3,528,729
FILM FEED MECHANISM FOR MOTION PICTURE PROJECTOR
Filed April 3, 1967     2 Sheets-Sheet 2
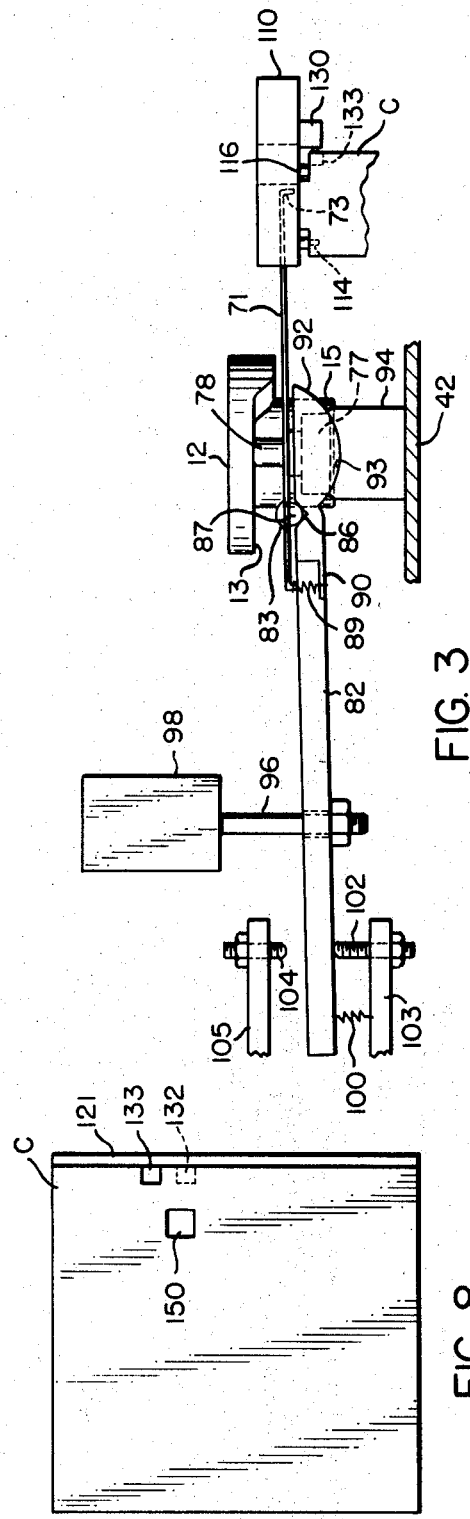
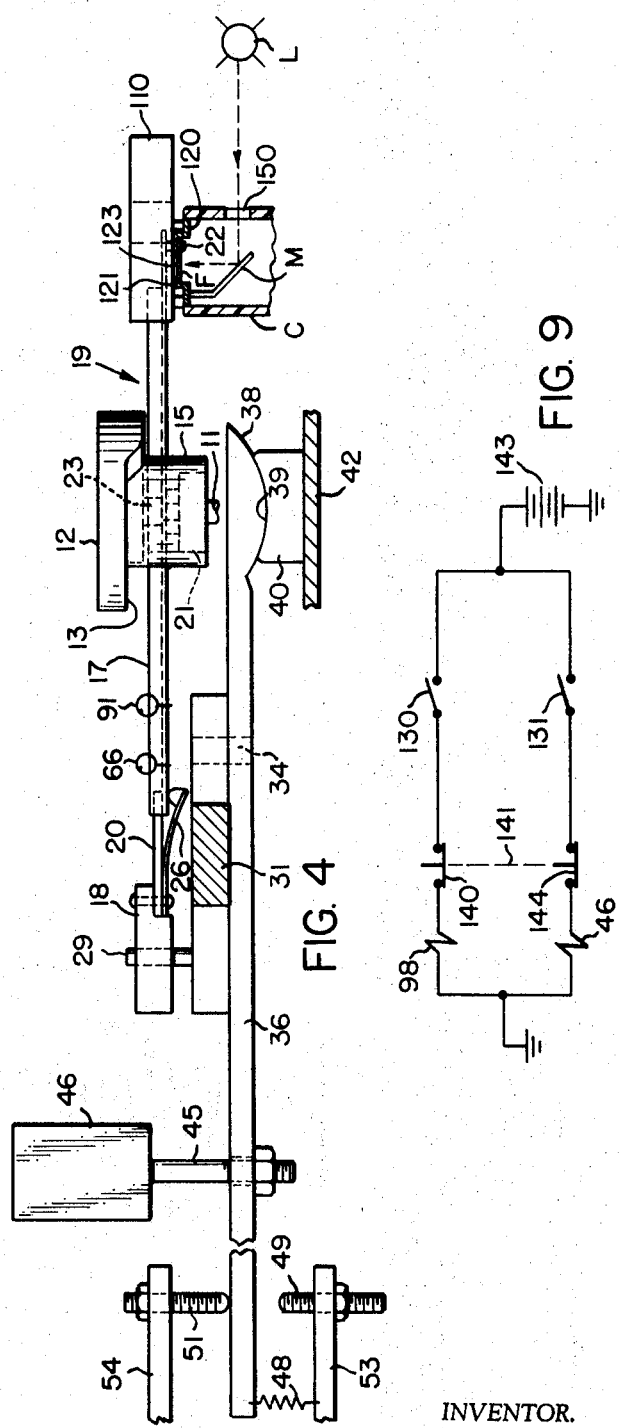
INVENTOR.
HOWARD C. DECK
BY 
ATTORNEY United States Patent Office 3,528,729
Patented Sept. 15, 1970

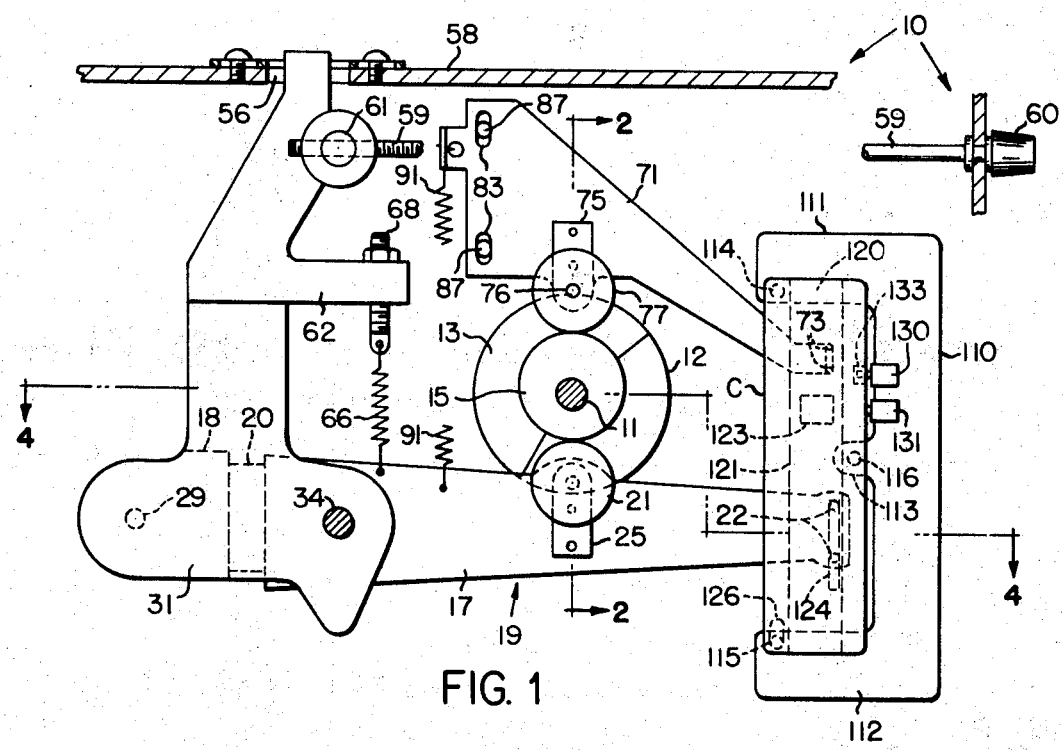

3,528,729
FILM FEED MECHANISM FOR MOTION PICTURE PROJECTOR
Howard Charles Deck, Rush, N.Y., assignor to Graflex, Inc., Rochester, N.Y., a corporation of Delaware
Filed Apr. 3, 1967, Ser. No. 627,696
Int. Cl. G03b 23/02
U.S. Cl. 352—72             12 Claims

ABSTRACT OF THE DISCLOSURE

For projecting two different sizes of film, the projector has two separate film-advancing claws. Each claw is operated in known fashion, first to engage the film, then to advance the film a frame, then to withdraw the claw and return it to starting position ready to begin a new cycle. A single cam actuates the two claws. The claws are operatively connected to the cam at diametrally opposite sides thereof, respectively. Cartridges containing different sized film, when inserted in the projector, trip, respectively, different switches. Each switch moves one of the claws from an inoperative to an operative position so that it can advance the film contained in the inserted cartridge.

---

This invention relates to motion picture projectors, and more particularly to film feed mechanism for such a projector.

Most motion picture projectors are designed to handle a specific film size, as for instance, 8 mm. or 16 mm. film. A principal reason for this is that the identical drive mechanism that is used to advance one size film, for example 8 mm. film, cannot be employed to advance another size, as, for instance, 16 mm. film, and vice versa. As a result, it has been necessary heretofore to manufacture and supply different projectors for different sizes of film.

A primary object of this invention is to provide a projector which will handle different sizes of film, and more specifically a projector which will accommodate both 8 and 16 mm. film.

Another object of this invention is to provide a projector of the type described, which is adapted to accommodate different sizes of film, and which is operative automatically upon insertion of a film cartridge into the projector to adjust its film feed drive mechanism for advancing the size of film contained in the cartridge.

A still further object of this invention is to provide an improved projector having two separate feed mechanisms for different sizes of film, as, for example, 8 and 16 mm. film, and both automatic and manually operable means for selectively actuating one of these two mechanisms, and for inactivating either or both of these mechanisms.

Other objects and advantages of the invention will be apparent hereinafter from the specification and from the recital of the appended claims, particularly when read in conjunction with the accompanying drawings.

SUMMARY OF THE INVENTION

For a better understanding of the construction and operation of the projector of the invention, it will be described in connection with a projector for handling selectively 8 mm. and 16 mm. film.

The illustrated mechanism is particularly suited for use with a projector of the type which uses film cartridges, and comprises a pair of film-advancing claws, which are operable selectively from the same drive shaft to advance 8 mm. and 16 mm. film, respectively. The two claws are movable by separate solenoids, respectively, into their respective operative positions, depending upon whether the film cartridge inserted into the projector contains 8 mm. or 16 mm. film. Normally both claws are held in their inoperative positions. When, however, an 8 mm. film cartridge, for instance, is inserted into the projector, it trips a first switch, which energizes the solenoid that moves the 8 mm. claw into its operative position. When power is applied to the projector drive shaft, then, the 8 mm. claw advances the film past the exposure aperture in the cartridge in known manner. When, on the other hand, a cartridge containing 16 mm. film is inserted into the projector, the cartridge trips a second switch, which energizes the solenoid that moves the 16 mm. claw into its operative position, so that when power is applied, the 16 mm. claw advances the 16 mm. film.

In addition to the above-noted cartridge-actuated switches, a manually-operable override switch is provided for deenergizing both of the above-noted solenoids, even though a cartridge is positioned in the projector, to move both claws to their inoperative positions so that a single frame of the film can be projected for as long as desired.

In the drawings:

FIG. 1 is a fragmentary interior view of a projector adapted to use, selectively, two different film cartridges, and showing therein a film feed mechanism made in accordance with one embodiment of this invention for feeding selectively the two different sizes of film contained in these cartridges, as for instance, 8 mm. and 16 mm. film;

FIG. 2 is a fragmentary sectional view taken along the line 2—2 in FIG. 1 looking in the direction of the arrows;

FIG. 3 is a fragmentary plan view of the feed mechanism, but illustrating principally those parts pertinent to the smaller size, that is, to the 8 mm. feed mechanism;

FIG. 4 is a fragmentary sectional view taken along the line 4—4 in FIG. 1 looking in the direction of the arrows, and illustrating the configuration for handling 16 mm. film;

FIG. 5 is an enlarged rear elevation view of the aperture plate forming part of the cartridge which is used for projecting 16 mm. film;

FIG. 6 is a transverse section thereof taken on the line 6—6 of FIG. 5;

FIG. 7 is a view, similar to that of FIG. 5, but showing the aperture plate of the cartridge which is used for projecting 8 mm. film;

FIG. 8 is a side elevation of a cartridge for holding 16 mm. film; and

FIG. 9 is a wiring diagram illustrating one manner in which the feed mechanisms may be controlled electrically.

Referring now to the drawings by numerals of reference, 10 designates a projector housing containing a drive shaft 11, and a removable film cartridge C. Secured to shaft 11 is a rotary cam 12, which has both a face cam portion 13, and an eccentric, cylindrical portion 15.

19 denotes a claw arm for advancing 16 mm. film, when film of this size is housed in the cartridge. Arm 19, which is generally similar to the claw arm illustrated in U.S. Pat. No. 3,152,741, granted Oct. 13, 1964, is made in two parts, 17 and 18, which are hingedly connected one to the other by a flexible, metal hinge plate 20 (FIGS 1 and 4). At its outer end arm 19 carries a pair of spaced, parallel, film-engaging pins 22; and at its inner end portion 18 thereof is pivoted on a pin 29, which projects from the lower end of a bracket 31. Rotatably mounted by a plate 25 on the part 17 of the arm is a roller follower 21, which has contact with the periphery of the eccentric 15. A follower 23, which projects from the arm 19 opposite the follower 21, is held in resilient engagement with the cam face 13 of cam 12 by a leaf spring 26 (FIG. 4) fastened at one end to part 18 and bearing at its opposite end on part 17. Bracket 31 is pivotally mounted on a pin 34, which is secured at one end in a rocker arm 36 (FIG. 4) intermediate the ends thereof.

While claw arm 19 is generally similar to that illustrated in U.S. Pat. 3,152,741, it will be apparent to one skilled in the art that any type of conventional swinging claw arm follower may be employed instead.

At one end thereof (the right end in FIG. 4) arm 36 has a segmental cylindrical knuckle 38 which seats in a concave seat 39 formed in the face of a stationary block or socket 40, which is fixed to a wall 42 of the projector. Members 38 and 40 guide the rocker arm 36 for pivotal movement about an axis which extends through the follower 23 at right angles to the axis of shaft 11. At its opposite end arm 36 is connected to the armature 45 of a solenoid 46, which is operative, when energized, to swing arm 36 against the resistance of a spring 48 from an inoperative position, in which arm 36 engages an adjustable stop member 49, to an operative position (shown in FIG. 4), in which the arm engages another adjustable stop member 51, which is aligned with but slightly spaced from stop member 49. Members 49 and 51 are mounted in stationary brackets 53 and 54, respectively, and spring 48 is connected at one end to the arm 36 and at its opposite end to the bracket 53, thereby constantly to urge the rocker arm 36 toward inoperative position.

As shown more clearly in FIG. 1, the bracket 31 pivots on pin 34, and extends at its upper end through an opening 56 in a wall 58 of the projector. It is pivotally adjustable about the axis of pin 34 by rotation of a knob 60, that is external of the projector, and that is secured to rod 59 that threads into a boss 61 formed on the bracket 31. Intermediate its ends bracket 31 has a lateral projection 62, which overlies the claw arm 19. A spring 66, which is connected at one end of the arm 19 and at its opposite end to a stud 68 adjustably threaded into projection 62, is operative constantly to urge the arm 19 counterclockwise (FIG. 1) about its pivot pin 29, thereby to maintain the roller follower 21 in engagement with the periphery of cam 12.

Mounted above the claw arm 19 is a further claw arm 71, which at one end thereof (the right end in FIGS. 1 and 3) has a pair of spaced, parallel film-engaging pins 73, which are adapted to advance 8 mm. film, when a cartridge thereof is inserted in the projector. Secured in a plate 75, which is fixed to the lower edge of the arm 71, is a stud 76 (FIGS. 1 and 2). Rotatably mounted on one end of stud 76 is a roller follower 77, which has engagement with the periphery of cam 12 diametrically opposite roller 21. At its opposite end stud 76 has an enlarged head 78, which engages as a follower against the cam surface 13.

Although followers 21 and 77 have been described as being rotatable, it will be apparent that they may instead be fixed to their respective arms 19 and 71, in which case they would have sliding contact with the periphery of the eccentric portion 15 of cam 12. If the followers 21 and 77 are not the rotatable type, it is preferred that they have a teardrop configuration.

Remote from its film-engaging end, the rear end of arm 71 is connected by a spring 89 to one end of a rocker arm 82. Adjacent its rear arm 71 has therein two vertically spaced grooves or recesses 83 (FIG. 1), each of which constitutes one race of a ball bearing, the other race of which is a registering notch or groove 86 (FIG. 3) in the rocker arm 82. Housed in the cooperating races 83 and 86 for vertical rolling movement therein are ball bearings 87 (FIG. 3) which, in addition to allowing vertical movement of the claw arm 71, also permit the latter to pivot slightly relative to arm 82 about a vertical axis. The spring 89, which connects the rear end of the claw arm 71 to a projection 90 on the rocker arm 82, urges arm 71 (counterclockwise in FIG. 3) about this vertical axis resiliently to hold the cam follower stud 78 on the arm 71 in engagement with the cam face 13. A further spring 91 (FIGS. 1 and 4) connect the rear end of claw arm 71 to arm 19, thereby to urge arm 71 downwardly, and to hold its follower 77 resiliently in engagement with the eccentric portion 15 of cam 12.

At one end the rocker arm 82 has a segmental cylindrical knuckle 92, which is pivotally seated in a concave recess or socket 93 formed in the face of a stationary block 94. Block 94 is secured to the wall 42 above the block 40. At this opposite end arm 82 is connected to the armature 96 of a solenoid 98. Spring 100 connected to the end of the arm 82 remote from its knuckle 92, urges the arm 82 normally into an inoperative position, in which the arm is engaged with an adjustable stop 102 carried by a stationary bracket 103. Upon being energized, the solenoid 98 pivots the arm 82 against the resistance of the spring 100, and into an operative position in which arm 82 is engaged with a stop 104 carried by a stationary bracket 105.

Secured in the projector adjacent the claw ends of the arms 19 and 71 is a reversed, generally E-shaped bracket 110, which has vertically spaced, parallel, top and bottom, laterally projecting arms 111 and 112, respectively (FIG. 1), and a somewhat shorter center arm 113, which projects into the space between the arms 111 and 112. The arms 111, 112 and 113 carry pins 114, 115 and 116, respectively, which are used for properly and accurately locating in the projector the below-noted aperture plate 120 or 120' of a film cartridge.

A cartridge C for 16 mm. film, comprises a housing having a film aperture and guide plate 120 (FIGS. 1, 4, 5 and 6). Plate 120 has a central, vertically extending ridge 121, which contains the exposure aperture 123 through which a frame of film is projected, and an elongate, film advancing slot 124 through which the pins 22 on the claw arm 19 project to engage in the usual perforations that are provided along the margin of the film. At one side of its ridge 121 the plate 120 has a hole 125 (FIG. 5) for accommodating the guide pin 114, and a vertical slot 126 for accommodating the pin 115. The pin 116 (FIG. 3) seats against the outer face of the plate 120 at the opposite side of the ridge 121. The hole 125 and the slot 126 fix the position of aperture plate 120 horizontally and vertically (in the X–Y plane, and the pin 116 prevents its from rocking, that is, fixes it in the Z plane.

The aperture plate 120' which is used in a cartridge for 8 mm. film is similar in construction to that for the 16 mm. film, but its exposure aperture 123' (FIG. 7) is, of course, smaller in area to suit the smaller size film carried in the cartridge. Moreover, the slot 124' for the claws 73, which advance the film in this cartridge, is disposed above the aperture 123' to suit the location of the claws 73. Its ridge 121' is also narrower than the ridge 121 (FIG. 6) of the film guide 120.

Secured to the bracket 110 between its arms 114 and 116 are two, normally-open switches 130 and 131 (FIG. 1), one of which is disposed above the other. The cartridges C for the 8 mm. and 16 mm. film, respectively, are provided with notches 132 and 133, respectively, which register with the plungers of the switches 130 or 131, respectively, so that the plunger of switch 131 will enter notch 132, when an 8 mm. cartridge is placed in the projector, and this switch will remain open, while the unnotched portion of the edge of this cartridge above notch 132 will engage and close the other switch 130. Similarly when the 16 mm. film cartridge is inserted in the projector, as shown in FIG. 1, its notch 133 registers with switch 130, so that this switch is opened, while the adjacent edge portion of the cartridge below notch 133 engages and closes switch 131. The cartridge illustrated in FIG. 8 is a 16 mm. cartridge, but the relative position of the notch 132 of an 8 mm. cartridge is shown in dotted lines at 132.

As illustrated in FIG. 9, the solenoid 98 is connected at one side to ground; and at its opposite side it is connectable through a normally-closed contact 140 of a manually operable switch 141, and the normally-open switch 130 (when closed) to a power source such as a battery 143. The solenoid 46 is connected to the same power source 143 in parallel with the solenoid 98, one side being connected to ground, and the opposite side being connectable through the second, also normally-closed contact 144 of the switch 141, and the normally-open switch 131 to source 143.

When the 16 mm. cartridge C is inserted into the projector, an aperture 150 (FIGS. 4 and 8) in one side thereof registers with a projection lamp L in the projector, and with a mirror M contained in the cartridge C, so that when the lamp is illuminated, light therefrom will be reflected by the mirror M, as indicated by the arrows in FIG. 4, through the film F and the aperture 123 to the projection screen. The now-closed switch 131 (FIG. 9) energizes the solenoid 46, to move the rocker arm 36 (FIG. 4) to the position shown in FIG. 4 and cause the claw arm 19 to pivot slightly about stud 23, which remains in engagement with the cam face 13, thereby registering the pins 22 with the slot 124 in the film cartridge. As the cam 12 rotates, then the stud 23 rides up onto the raised portion (FIG. 4) of the cam face 13, and the pins 22 engage the perforations in the film F. Then the eccentric 15 causes the arm 19 to swing downwardly about pivot pin 29 to advance the film in the cartridge. Then the stud 23 passes onto the low portion of the cam face 13 withdrawing the pins 22 from the film; and the eccentric swings the arm 19 back to its starting position.

As the cam 12 revolves then it continues to operate the claw arm 19 to advance the film frame-by-frame past the exposure aperture.

When 8 mm. film is to be projected the 16 mm. cartridge is removed from the projector; and a cartridge containing 8 mm. film is substituted. The removal of the 16 mm. cartridge deenergizes solenoid 46 so that the 16 mm. film feed arm 19 is swung back to its inoperative position by spring 48. The notch 132 in the newly inserted 8 mm. cartridge registers with the plunger of switch 131, leaving that switch open, but this new cartridge closes switch 130 so that arm 71 is swung to its operative position. Now the claws 73 register with the slot 124' in aperture plate 120', and when the shaft 11 rotates the cam 12 causes them to engage in the perforations of the film, pull the film down, withdraw, move upwardly again to starting position, and restart the cycle again all in a manner similar to the operation for the 16 mm. cartridge as above described.

From the foregoing it will be apparent that applicant has devised relatively simple means for selectively projecting different sizes of film from the same projector. This selection is made automatically by insertion of the respective cartridges into the projector. Compactness and economy are realized because one projector will do the work of two.

If it is desired, the projector drive mechanism can be stopped to allow a single frame of film to be viewed, merely by pushing the manually operable switch 141. This breaks the circuit to both solenoids 46 and 98, so that both rocker arms 36 and 82 are swung to their inoperative positions, even though at the moment one of the switches 130 or 131 is closed by the cartridge then in the projector.

Although not illustrated, it is to be understood that each film cartridge contains, in addition to its aperture plate 120 or 120', a conventional film pressure shoe, and film edge guide.

When inserted into the projector, the cartridge is guided by its outside surfaces into place, and is detented in place by conventional means. The three locating pins 114, 115 and 116 effect the final location of the aperture plate, and deflect the plate in the cartridge mounting. One pin 114 locates in a hole, the second pin 115 locates in a slot, and the third pin 116 supports the aperture plate against rocking. This provides for very accurate location of the aperture plate, and prevents any undesirable rocking thereof, despite any tolerance build-up.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A motion picture projector comprising
   a housing,
   a drive shaft journaled in said housing,
   a pair of movable claw arms mounted in said housing adjacent said shaft, each of said arms having a pin on one end thereof for engaging and advancing film,
   cam means operatively connecting said shaft and said arms and operative to move each arm to advance the film engaged by the pin thereon,
   means for removably supporting a supply of film in said housing adjacent said pins, and
   control means operable independently of said cam means for selectively moving each of said arms between an operative position in which the pin thereon is engageable with the film in said supply, and an inoperative position in which the pin thereon cannot engage the film in said supply,
   said control means comprising a second pair of arms, each of which is mounted in said housing to pivot about an axis perpendicular to said shaft,
   means mounting said claw arms on said second pair of arms for movement relative thereto by said cam means and for movement by said second pair of arms between said operative and inoperative positions, and
   means for selectively pivoting each of said second pair of arms between a first position in which the claw arm thereon is disposed in its inoperative position, and a second position in which the claw arm thereon is disposed in its operative position.

2. A projector as defined in claim 1, wherein said pivoting means comprises
   a pair of solenoids each of which is operative, when energized, to pivot one of said second pair of arms from one to the other of its limit positions, and
   means for automatically energizing one of said solenoids upon the insertion of a supply of film into said housing.

3. A projector as defined in claim 2 including means for deenergizing said one solenoid when said supply of film is in said housing.

4. A projector as defined in claim 2, wherein
   said supporting means comprises a bracket for supporting a film cartridge adjacent said claw arms,
   said energizing means comprises a pair of switches mounted on said bracket, and
   a cartridge is mounted on said bracket and has means thereon for operating one only of said switches.

5. A projector as defined in claim 1, wherein said mounting means comprises
   a plurality of ball bearings interposed between one of said claw arms and the arm of said second pair on which it is mounted, and having a common axis extending at right angles to said shaft, and
   means for guiding said one claw arm for pivotal movement by said cam means about said common axis of said bearings, and for reciprocation longitudinally of the last-named axis.

6. A motion picture projector comprising
   a housing, a drive shaft journaled in said housing,
a pair of movable claw arms mounted in said housing adjacent said shaft, each of said arms having a pin on one end thereof for engaging and advancing fim,
cam means operatively connecting said shaft and said arms and operative to move each arm to advance the fim engaged by the pin thereon,
means for removably supporting a supply of film in said housing adjacent said pins, and
control means operable independently of said cam means for selectively moving each of said arms between an operative position in which the pin thereon is engageable with the film in said supply, and an inoperative position in which the pin thereon cannot engage the film in said supply,
each of said claw arms being mounted for movement by said cam means radially of said shaft and pivotally about a first axis that extends transverse to said shaft,
said control means including means for pivoting each of said claw arms about a second axis that extends parallel to said first axis,
said cam means comprising a rotary cam secured to said shaft for rotation thereby between said arms,
a cam follower mounted on each of said claw arms and engaged with said cam to pivot said arm about its first axis upon the rotation of said cam, and
the second pivotal axis of each of said claw arms extending through its cam follower.

7. A motion picture projector comprising
a housing,
a drive shaft journaled in said housing,
a pair of movable claw arms mounted in said housing adjacent said shaft, each of said arms having a pin on one end thereof for engaging and advancing film,
cam means operatively connecting said shaft and said arms and operative to move each arm to advance the film engaged by the pin thereon,
means for removably supporting a supply of film in said housing adjacent said pins, and
control means operable independently of said cam means for selectively moving each of said arms between an operative position in which the pin thereon is engageable with the film in said supply, and an inoperative position in which the pin thereon cannot engage the film in said supply,
said cam means comprising a rotary cam secured to said shaft for rotation thereby between said arms,
one of said arms having a follower engaged with said cam, and pivotal thereby about a first axis parallel to said shaft, and about a second axis at right angles to said shaft, and
the other of said arms having a follower engaged with said cam, and reciprocable thereby transversely of said shaft, and pivotal thereby about a third axis at right angles to said shaft.

8. A motion picture projector adapted to receive selectively cartridges containing, respectively, film of two different sizes, and comprising
separate means for driving the two differently sized films, respectively,
means whereby upon insertion of a cartridge containing film of one size into the projector, the corresponding film driving means is rendered operative,
means whereby upon insertion of a cartridge containing film of the other size into the projector the other film driving means is rendered operative,
said separate means comprising a pair of movable film-advancing members movable into and out of operative positions in which they are engageable with, respectively, said one and said other film size, respectively, to advance the corresponding film in said projector,
a pair of solenoids for selectively moving said members between their active and inactive positions, respectively,
a pair of spaced switches on the projector and connected in circuit with said solenoids, and actuatable selectively to energize said solenoids,
the first-named cartridge being operative upon the insertion thereof into said projector to actuate one of said switches, and
the second-named cartridge being operative upon the insertion thereof into said projector to actuate the other of said switches.

9. A motion picture projector as defined in claim 8, wherein
each of said switches has a plunger engageable by one of said cartridges to actuate the associated switch,
said first-named cartridge has therein a recess, which registers with the plunger of said other switch to avoid actuating the latter, when said first-named cartridge is inserted in said projector, and
said second-named cartridge has therein a recess, which registers with the plunger of said one switch to avoid actuating said one switch, when said second-named cartridge is inserted in said projector.

10. A motion picture projector adapted to receive selectively cartridges containing, respectively, film of two different sizes, and comprising
separate means for driving the two differently sized films, respectively,
means whereby upon insertion of a cartridge containing film of one size into the projector, the corresponding film driving means is rendered operative,
means whereby upon insertion of a cartridge containing film of the other size into the projector the other film driving means is rendered operative.
said driving means comprising a rotatable drive shaft in the projector,
a cam secured to said shaft for rotation thereby,
a pair of movable film-advancing members engageable with, respectively, said one and said other size film, respectively, to advance the corresponding film in said projector,
means connecting said members to diametrally opposite sides, respectively, of said cam for movement thereby upon the rotation of said shaft,
means mounting said members in said projector for movement between operative and inoperative positions, respectively,
means normally holding said members in their inoperative positions to prevent engagement of said members with said film, and
a pair of switches in said projector, one of which is actuatable by the first-named cartridge upon its insertion into the projector to move one of said members to its operative position in which it is engageable with the film in said first-named cartridge, and the other of which is actuatable by the second-named cartridge upon its insertion into the projector to move the other of said members to its operative position in which it is engageable with the film in said second-named cartridge.

11. A motion picture projector adapted to receive selectively cartridges containing, respectively, film of two different sizes, and comprising
separate means in the projector movable between operative and inoperative positions, respectively, for selectively driving the two differently sized films, respectively,
means releasably retaining said separate driving means in inoperative positions,
means whereby upon insertion of a cartridge containing film of one size into the projector, the corresponding film driving means is moved from its inoperative to its operative position,
means whereby upon insertion of a cartridge containing film of the other size into the projector the other film driving means is moved to its operative position, said projector having thereon a plurality of spaced locating pins, each of said cartridges including a film guide plate having a guide portion for guiding film during the advance thereof in the cartridge by said driving means, said plate having therethrough a pair of spaced locating apertures, two of said pins engaging in said locating apertures, when one of said cartridges is inserted in said projector, to position said plate relative to a first pair of intersecting planes, and a third pin on said projector engaging the film guide plate of the last-named cartridge to position said plate in a third plane normal to said first pair of planes.

12. A motion picture projector as defined in claim 11, wherein said two pins are conical, said apertures are located adjacent one side of said guide portion and are spaced from one another in the direction of movement of the film, and said third pin is disposed to engage said plate at the opposite side of said guide portion from said apertures.

References Cited

UNITED STATES PATENTS

| | | | |
|---|---|---|---|
| 2,339,202 | 1/1944 | Stechbart | 352—72 X |
| 2,552,250 | 5/1951 | Bornemann. | |
| 3,120,781 | 2/1964 | Babcock | 352—72 |
| 3,152,741 | 10/1964 | Jorgensen | 226—65 |
| 3,314,344 | 4/1967 | Anwyl | 352—72 |
| 3,395,965 | 8/1968 | Teshi | 352—79 X |
| 3,402,006 | 9/1968 | Bundschuh | 352—79 |

FOREIGN PATENTS

| | | |
|---|---|---|
| 675,898 | 7/1952 | Great Britain. |
| 397,415 | 2/1966 | Switzerland. |
| 1,038,906 | 9/1958 | Germany. |

NORTON ANSHER, Primary Examiner

M. H. HAYES, Assistant Examiner

U.S. Cl. X.R.

352—168